(12) United States Patent
Yu et al.

(10) Patent No.: US 10,994,594 B2
(45) Date of Patent: *May 4, 2021

(54) HORIZONTAL VEHICLE DRIVE ASSEMBLY

(71) Applicant: JING-JIN ELECTRIC TECHNOLOGIES CO., LTD., Beijing (CN)

(72) Inventors: Ping Yu, Beijing (CN); Xueliang Wang, Beijing (CN); Jianwen Li, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/478,266

(22) PCT Filed: Dec. 12, 2017

(86) PCT No.: PCT/CN2017/115669
§ 371 (c)(1),
(2) Date: Jul. 16, 2019

(87) PCT Pub. No.: WO2018/137422
PCT Pub. Date: Aug. 2, 2018

(65) Prior Publication Data
US 2019/0359045 A1 Nov. 28, 2019

(30) Foreign Application Priority Data
Jan. 24, 2017 (CN) .......................... 201710059917.2

(51) Int. Cl.
*B60K 6/36* (2007.10)
*B60K 1/02* (2006.01)
(Continued)

(52) U.S. Cl.
CPC ................. *B60K 1/02* (2013.01); *B60K 6/36* (2013.01); *B60K 6/38* (2013.01); *B60K 6/54* (2013.01);
(Continued)

(58) Field of Classification Search
None
See application file for complete search history.

(56) References Cited

U.S. PATENT DOCUMENTS 10,814,709 B2 * 10/2020 Yu ........................... F16H 3/089
2002/0082134 A1 * 6/2002 Hirt ........................... B60K 6/48
477/3

(Continued)

FOREIGN PATENT DOCUMENTS

CN 204020556 U 12/2014
CN 104290587 A 1/2015
(Continued)

*Primary Examiner* — Justin Holmes
(74) *Attorney, Agent, or Firm* — LKGlobal | Lorenz & Kopf, LLP

(57) ABSTRACT

A transverse vehicle drive assembly, wherein the transverse vehicle drive assembly comprises a first power source and an automatic transmission (10), a first intermediate shaft (31) is provided parallel to a first input shaft (21) of the automatic transmission (10), a second intermediate shaft (32) is provided coaxial with the first input shaft (21), a third intermediate shaft (33) is provided coaxial with the first intermediate shaft (31), a first clutch (41) is provided between the first intermediate shaft (31) and the third intermediate shaft (33), and a second clutch (42) is provided between the first input shaft (21) and the second intermediate shaft (32). A first gear (11) on the first input shaft (21) and a second gear (12) on the first intermediate shaft (31) are in engaged transmission; and a third gear (13) on the second intermediate shaft (32) and a fourth gear (14) on the third intermediate shaft (33) are in engaged transmission, and the
(Continued)

fourth gear (14) on the third intermediate shaft (33) is simultaneously in engaged transmission with a fifth gear (15) on a differential (50). The drive assembly can realize transmission of two speed ratios, and the transmission modes are flexible. The longitudinal dimension and the lateral dimension of the drive assembly are reduced, to be adapted for vehicles of a compact structure. Because a small quantity of gears are used, the transmission structure is simplified.

10 Claims, 2 Drawing Sheets

(51) Int. Cl.
 *B60K 6/38* (2007.10)
 *B60K 6/54* (2007.10)
 *B60K 17/02* (2006.01)
 *B60K 17/08* (2006.01)
 *B60K 17/16* (2006.01)

(52) U.S. Cl.
 CPC .............. *B60K 17/02* (2013.01); *B60K 17/08* (2013.01); *B60K 17/165* (2013.01)

(56) References Cited

U.S. PATENT DOCUMENTS

| | | | |
|---|---|---|---|
| 2008/0072586 A1* | 3/2008 | Hammond | .............. F16H 45/02 60/330 |
| 2012/0006153 A1 | 1/2012 | Imamura | |
| 2014/0157924 A1* | 6/2014 | Wechs | ...................... F16H 1/22 74/330 |
| 2016/0137045 A1* | 5/2016 | Zhu | .......................... F16H 3/006 475/5 |
| 2016/0137048 A1* | 5/2016 | Zhu | .......................... B60K 6/48 475/5 |
| 2017/0008510 A1 | 1/2017 | Imamura et al. | |

FOREIGN PATENT DOCUMENTS

| | | |
|---|---|---|
| CN | 104595450 A | 5/2015 |
| CN | 204367890 U | 6/2015 |
| CN | 106274461 A | 1/2017 |
| CN | 106627078 A | 5/2017 |
| CN | 106740024 A | 5/2017 |
| CN | 106882041 A | 6/2017 |
| CN | 206678782 U | 11/2017 |
| CN | 206797095 U | 12/2017 |
| EP | 3020588 A2 | 5/2016 |

\* cited by examiner

HORIZONTAL VEHICLE DRIVE ASSEMBLY

CROSS-REFERENCE TO RELATED APPLICATION

This application is a U.S. National-Stage entry under 35 U.S.C. § 371 based on International Application No. PCT/CN2017/115669 filed Dec. 12, 2017 which was published under PCT Article 21(2) and which claims priority to Chinese Application No. 201710059917.2, filed Jan. 24, 2017, which are all hereby incorporated herein in their entirety by reference.

TECHNICAL FIELD

This application pertains to a transverse vehicle drive assembly, connected to a front axle or rear axle of a vehicle, for driving the vehicle.

BACKGROUND

In current purely electrical driven or hybrid power new energy automobiles, the dynamic characteristics of the employed electric motors deviate from the requirements of the entire vehicle, and cannot satisfy the requirements of speed ratio and moment. Because new energy automobiles are required to face increasingly complicated working conditions and road conditions, and the users are having increasingly higher requirements on the comfort degree and the endurance mileage of new energy automobiles, the new energy automobiles of simple electric motor directly driving mode, electric-motor-connected-to-speed-reducer mode or oil-electricity hybrid power mode cannot satisfy the demands on the development of the new energy automobile industry.

In the current vehicle power assemblies, the first power source, the clutch, the gearbox or speed reducer, and the driving shaft are generally longitudinally arranged, which has a large length and occupies a large vehicle room, and is not applicable to some miniature vehicles that require a compact structure.

Furthermore, in current purely electrical driven or hybrid power new energy automobiles, speed reducers cannot use conventional friction clutches because the shock of the rotor shaft of the electric motor is large (the rotor shaft of the electric motor and the first input shaft of the transmission are not integrated, but are two independent shafts), and the used clutch can only be in the way of hard connection, and does not possess cushioning effect, which cannot satisfy the requirements of new energy automobiles.

In the existing automobiles of the electric motor directly driving mode, the power system does not have clutch function, the conventional inertia friction synchronizers cannot be used, and the transmission cannot shift gears and can only use a single speed ratio. The startup and stopping of the entire vehicle can only rely on the startup and stopping of the electric motor, which affects the performance of the electric motor. In addition, other objects, desirable features and characteristics will become apparent from the subsequent summary and detailed description, and the appended claims, taken in conjunction with the accompanying drawings and this background.

SUMMARY

Aiming at the above problems of the prior art, the present disclosure provides a transverse vehicle drive assembly, to solve the problem of single speed ratio transmission of the existing power assemblies, which cannot be adapted for complicated road conditions and working conditions.

Additionally, the present disclosure is to solve the problems of the existing power assemblies that the longitudinal dimension and the lateral dimension are large, which cannot be used in vehicles with a compact structure, and that the quantity of the gears in the transmission is larger and thus the transmission structure is complicated.

To achieve the above objects, the technical solutions of the present disclosure are realized as follows:

The present disclosure provides a transverse vehicle drive assembly, connected to a vehicle axle half shaft, wherein the vehicle drive assembly comprises a first power source and an automatic transmission, the automatic transmission is provided with a first input shaft, the first power source is connected to the first input shaft, and a differential is provided at a connection between the automatic transmission and the vehicle axle half shaft;

in the automatic transmission, a first intermediate shaft is provided parallel to the first input shaft, a second intermediate shaft is provided coaxial with the first input shaft, a third intermediate shaft is provided coaxial with the first intermediate shaft, a first clutch is provided between the first intermediate shaft and the third intermediate shaft, and a second clutch is provided between the first input shaft and the second intermediate shaft; and the first input shaft is provided with a first gear, the first intermediate shaft is provided with a second gear, and the first gear and the second gear are in engaged transmission; the second intermediate shaft is provided with a third gear, the third intermediate shaft is provided with a fourth gear, and the third gear and the fourth gear are in engaged transmission; and the differential is provided with a fifth gear, and the fourth gear is simultaneously in engaged transmission with the fifth gear.

Optionally, when the first clutch is engaged, the first power source transmits power to the vehicle axle half shaft via sequentially the first input shaft, the first gear, the second gear, the first intermediate shaft, the first clutch, the third intermediate shaft, the fourth gear, the fifth gear and the differential.

Optionally, an engaged transmission ratio of the first gear to the second gear is i1, an engaged transmission ratio of the fourth gear to the fifth gear is i2, and when the first clutch is engaged, an engaged transmission ratio in the automatic transmission is i1×i2.

Optionally, when the second clutch is engaged, the first power source transmits power to the vehicle axle half shaft via sequentially the first input shaft, the second clutch, the second intermediate shaft, the third gear, the fourth gear, the fifth gear and the differential.

Optionally, an engaged transmission ratio of the third gear, the fourth gear and the fifth gear is i3, and when the second clutch is engaged, an engaged transmission ratio in the automatic transmission is i3.

Optionally, the vehicle drive assembly further comprises a second power source;

in the automatic transmission, a second input shaft is provided parallel to the second intermediate shaft, and the second power source is connected to the second input shaft;

the second input shaft is provided with a sixth gear, and the sixth gear is engaged with the third gear on the second intermediate shaft;

the second power source is an electric motor, and the second power source transmits power to the vehicle axle half shaft via sequentially the second input shaft, the sixth gear, the third gear, the fourth gear, the fifth gear and the differential; and an engaged transmission ratio of the sixth gear, the third gear, the fourth gear and the fifth gear is i4, and when both of the first clutch and the second clutch are disengaged, an engaged transmission ratio in the automatic transmission is i4.

Optionally, the first power source is an electric motor or a combination of an engine and an ISG motor.

Optionally, the first power source is a combination of an engine and an ISG motor, and a torsion damper is provided between the engine and the ISG motor.

Optionally, the vehicle axle half shaft is a front axle half shaft or a rear axle half shaft.

Optionally, the first clutch and the second clutch are contrate tooth clutches; and the contrate tooth clutch is of an electromagnetically drive type, or a hydraulically drive type, or a pneumatically drive type, or an electrically drive type.

The present disclosure, by employing the above structure configurations, has the following advantages:

The transverse vehicle power assembly of the present disclosure is connected to the rear axle half shaft or the front axle half shaft of the vehicle, and the vehicle drive assembly comprises a first power source and an automatic transmission. The power assembly can realize transmission of two speed ratios, and the transmission modes are flexible, which satisfies the demands of the entire vehicle on travelling on different road conditions. When the vehicle is climbing a slope with a weight burden, it can select the larger speed ratio transmission, to increase the driving force of the entire vehicle and overcome the defect of the deficient driving force of the entire vehicle. When the entire vehicle is in the cruising condition, it can select the smaller speed ratio transmission, to satisfy the requirement by the entire vehicle on high-speed travelling, save energy, and increase the endurance mileage of the vehicle. Moreover, the two transmission ratios are not limited by the main reduction ratio, and the two speed ratios are more flexible in designing.

The design mode of the torsion damper in combination with the contrate tooth clutches can minimize the kinetic energy loss, which overcomes the defect of too short service lives traditional friction clutches because they cannot withstand the dynamic shock of the electric motor.

Furthermore, the present disclosure further adds the second power source, and thus transmission of three speed ratios can be realized. When the vehicle is climbing a slope with a weight burden, it can select the double power input, to increase the driving force of the entire vehicle and overcome the defect of the deficient driving force of the entire vehicle.

The transverse vehicle drive assembly that is provided by the present disclosure, in an aspect, has a reduced longitudinal dimension and the lateral dimension, to be adapted for vehicles of a compact structure, and, in another aspect, because a small quantity of gears are used, has a simplified transmission structure.

BRIEF DESCRIPTION OF DRAWINGS

The present invention will hereinafter be described in conjunction with the following drawing figures, wherein like numerals denote like elements, and.

Figure 1:
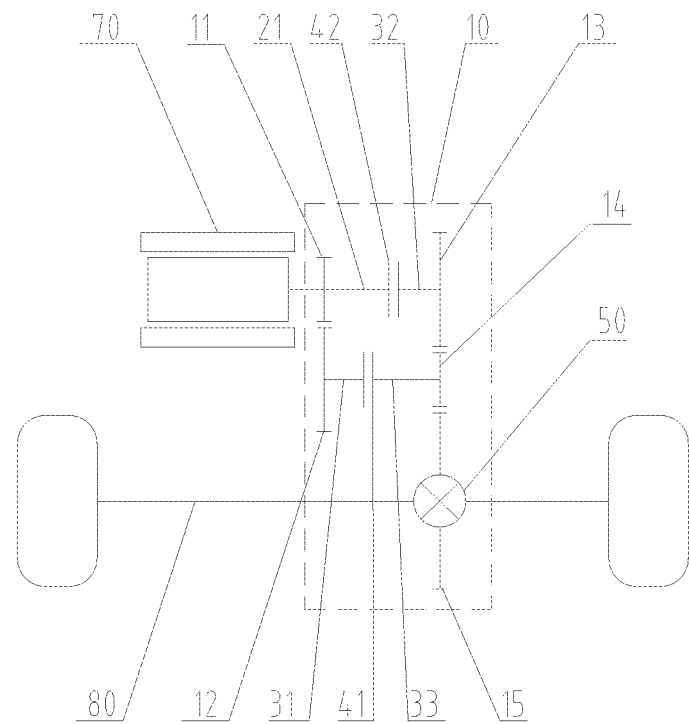
FIG. 1 is a schematic structural diagram of the transverse vehicle drive assembly of the first embodiment of the present disclosure.

In the drawings:
10. automatic transmission;
11. first gear;
12. second gear;
13. third gear;
14. fourth gear;
15. fifth gear;
16. sixth gear;
21. first input shaft;
22. second input shaft;
31. first intermediate shaft;
32. second intermediate shaft;
33. third intermediate shaft;
41. first clutch;
42. second clutch;
50. differential;
60. engine;
61. ISG motor;
62. torsion damper;
70. electric motor;
80. vehicle axle.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In order to make the objects, the technical solutions and the advantages of the present disclosure clearer, the embodiments of the present disclosure will be described below in further detail in conjunction with the drawings.

The First Embodiment

The first embodiment of the present disclosure provides a transverse vehicle drive assembly. As shown in FIG. 1, the transverse vehicle drive assembly is connected to the vehicle axle half shaft, the vehicle drive assembly comprises a first power source and an automatic transmission 10, the automatic transmission 10 is provided with a first input shaft 21, the first power source is connected to the first input shaft 21, and a differential 50 is provided at the connection between the automatic transmission 10 and the vehicle axle half shaft.

In the first embodiment of the present disclosure, the first power source is an electric motor 70, and the rotor shaft of the electric motor 70 and the first input shaft 21 are integrated, which prevents the problem of a relatively large shock when the rotor shaft of the electric motor and the first input shaft of the transmission are two shafts.

In the automatic transmission 10, a first intermediate shaft 31 is provided parallel to the first input shaft 21, a second intermediate shaft 32 is provided coaxial with the first input shaft 21, a third intermediate shaft 33 is provided coaxial with the first intermediate shaft 31, a first clutch 41 is provided between the first intermediate shaft 31 and the third intermediate shaft 33, and a second clutch 42 is provided between the first input shaft 21 and the second intermediate shaft 32.

The first input shaft 21 is provided with a first gear 11, the first intermediate shaft 31 is provided with a second gear 12, and the first gear 11 and the second gear 12 are in engaged transmission; the second intermediate shaft 32 is provided with a third gear 13, the third intermediate shaft 33 is provided with a fourth gear 14, and the third gear 13 and the fourth gear 14 are in engaged transmission; and the differential 50 is provided with a fifth gear 15, and the fourth gear 14 is simultaneously in engaged transmission with the fifth gear 15.

Accordingly, it can be known that, the transmission of the vehicle drive assembly of the first embodiment of the present disclosure is different from the traditional transmissions with a layout mode of the first input shaft, the intermediate shaft and the output shaft, which, in an aspect, reduces the longitudinal dimension and the lateral dimension of the drive assembly, to be adapted for vehicles of a compact structure, and, in another aspect, because a small quantity of gears are used, simplifies the transmission process.

The power transmission mode of the drive assembly is as follows:

When the first clutch 41 is engaged, the first power source transmits power to the vehicle axle half shaft via sequentially the first input shaft 21, the first gear 11, the second gear 12, the first intermediate shaft 31, the first clutch 41, the third intermediate shaft 33, the fourth gear 14, the fifth gear 15 and the differential 50. The engaged transmission ratio of the first gear 11 to the second gear 12 is set to i1, and the engaged transmission ratio of the fourth gear 14 to the fifth gear 15 is set to i2, so when the first clutch 41 is engaged, the engaged transmission ratio in the automatic transmission 10 is i1×i2. That is the first working condition.

When the second clutch 42 is engaged, the first power source transmits power to the vehicle axle half shaft via sequentially the first input shaft 21, the second clutch 42, the second intermediate shaft 32, the third gear 13, the fourth gear 14, the fifth gear 15 and the differential 50. The engaged transmission ratio of the third gear 13, the fourth gear 14 and the fifth gear 15 is i3, so when the second clutch 42 is engaged, the engaged transmission ratio in the automatic transmission 10 is i3. That is the second working condition.

When the first clutch 41 and the second clutch 42 are simultaneously disengaged, neutral position is realized.

In that, the magnitudes of the transmission ratios i1, i2 and i3 may be changed by changing the sizes or tooth numbers of the gears, thereby changing the transmission ratio of the automatic transmission 10.

Accordingly, it can be known that, the vehicle drive assembly can realize transmission of two speed ratios. The automatic transmission can realize the electronically controlled automatic gear shifting between the two gears according to a controlling strategy program, and the transmission modes are flexible, which satisfies the demands of the entire vehicle on travelling on different road conditions. When the vehicle is climbing a slope with a weight burden, it can select the larger speed ratio transmission, to increase the driving force of the entire vehicle and overcome the defect of the deficient driving force of the entire vehicle. When the entire vehicle is in the cruising condition, it can select the smaller speed ratio transmission, to satisfy the requirement by the entire vehicle on high-speed travelling, save energy, and increase the endurance mileage of the vehicle.

The first clutch 41 and the second clutch 42 each are preferably configured to be a contrate tooth clutch, comprising a movable fluted disc and a fixed fluted disc that perform engaged transmission. The movable fluted disc is provided with end face transmission teeth or tooth spaces, and the fixed fluted disc is correspondingly provided with end face tooth spaces or transmission teeth. The contrate tooth clutches, compared with friction clutches, can reduce kinetic energy loss to the largest extent, which overcomes the defect of too short service lives of traditional friction clutches because they cannot withstand the dynamic shock of the electric motor.

The drive manner of the contrate tooth clutches may be of the electromagnetically drive type (driven by electromagnet attraction), or the hydraulically drive type (driven by a hydraulic mechanism), or the pneumatically drive type (driven by a pneumatic mechanism), or the electrically drive type (driven by an electric motor), to drive the movable fluted disc to axially move to engage with the fixed fluted disc.

In the case that the first clutch 41 and the second clutch 42 are electromagnetic jaw clutches, when the vehicle drive assembly performs power input, the electromagnetic jaw clutches can enable the power and the entire vehicle to be disengaged and engaged instantly at any moment, which realizes the smooth switch of the power and increases the travelling stability of the vehicle.

In the first embodiment of the present disclosure, the vehicle axle half shaft is a front axle half shaft or a rear axle half shaft. When the vehicle drive assembly is connected to the front axle half shaft, the vehicle is in a front driving mode; and when the vehicle drive assembly is connected to the rear axle half shaft, the vehicle is in a rear driving mode.

The Second Embodiment

Figure 2:
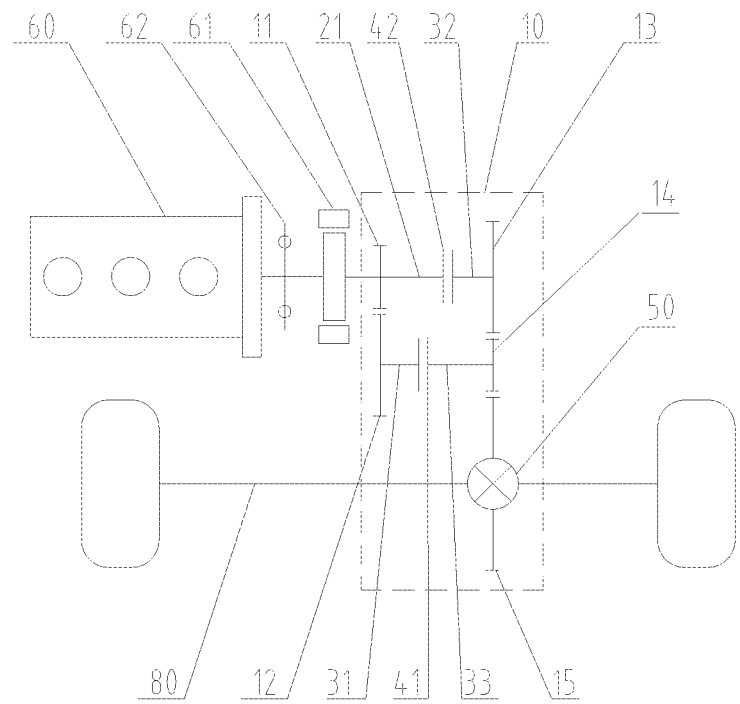
FIG. 2 is a schematic structural diagram of the transverse vehicle drive assembly of the third embodiment of the present disclosure.

In the second embodiment of the present disclosure, as shown in FIG. 2, the first power source is a combination of an engine 60 and an ISG motor 61. In an aspect, the idle loss and pollution of the engine 60 are reduced, and in another aspect, the ISG motor 61 serves as an electric generator and a starter, and can regeneratively generate electricity and recover energy, to save energy.

The other contents of the second embodiment of the present disclosure are the same as those of the first embodiment, and are not described repeatedly here.

The Third Embodiment

In the third embodiment of the present disclosure, as shown in FIG. 2, a torsion damper 62 is provided between the engine 60 and the ISG motor 61, and the torsion damper 62 has cushioning effect, and can reduce the torsional rigidity at a connection between the engine 60 and the ISG motor 61, thereby reducing the inherent frequency of torsional vibration and eliminating torsional vibration.

The other contents of the third embodiment of the present disclosure are the same as those of the first embodiment, and are not described repeatedly here.

The Fourth Embodiment

The fourth embodiment of the present disclosure is an improvement made on the basis of the third embodiment, and the contents of the third embodiment are also within the protection scope of the fourth embodiment.

Figure 3:
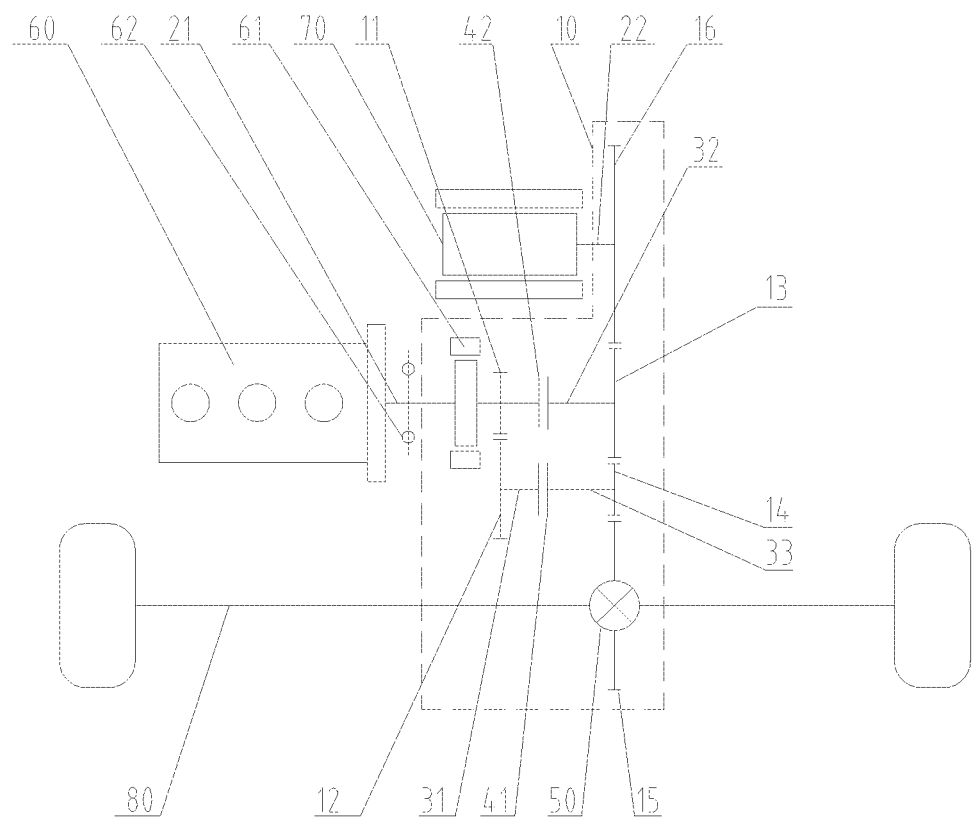
FIG. 3 is a schematic structural diagram of the transverse vehicle drive assembly of the fourth embodiment of the present disclosure.

In the fourth embodiment of the present disclosure, as shown in FIG. 3, the vehicle drive assembly is added with a second power source on the basis of the third embodiment, wherein the second power source is an electric motor 70;

in the automatic transmission 10, a second input shaft 22 is provided parallel to the second intermediate shaft 32, and the second power source is connected to the second input shaft 22;

the second input shaft 22 is provided with a sixth gear 16, and the sixth gear 16 is engaged with the third gear 13 on the second intermediate shaft 32; and the second power source transmits power to the vehicle axle half shaft via sequentially the second input shaft 22, the sixth gear 16, the third gear 13, the fourth gear 14, the fifth gear 15 and the differential 50.

The engaged transmission ratio of the sixth gear 16, the third gear 13, the fourth gear 14 and the fifth gear 15 is set to i4, so when both of the first clutch 41 and the second clutch 42 are disengaged, the engaged transmission ratio in the automatic transmission 10 is i4. At this point, both of the third gear 13 and the fourth gear 14 are idle gears.

It should be noted that, because the second power source is an auxiliary power source, and the speed of the electric motor can be randomly adjusted, in the first working condition wherein the first power source is started up, the first clutch 41 is engaged and the engaged transmission ratio in the automatic transmission 10 is i1×i2, if the second power source is simultaneously started up, the engaged transmission ratio in the automatic transmission 10 still maintains the above one, that is, i1×i2. In like manner, in the second working condition wherein the first power source is started up, the second clutch 42 is engaged and the engaged transmission ratio in the automatic transmission 10 is i3, if the second power source is simultaneously started up, the engaged transmission ratio in the automatic transmission 10 still maintains the above one, that is, i3.

Accordingly, it can be known that, including the two transmission ratios described in the third embodiment, the vehicle drive assembly of the fourth embodiment can realize dual power source input and transmission of three speed ratios, that is, i1×i2, i3 and i4, and the transmission modes are flexible, which satisfies the demands of the entire vehicle on travelling on different road conditions. When the vehicle is climbing a slope with a weight burden, it can select the dual power input and the larger speed ratio transmission, to increase the driving force of the entire vehicle and overcome the defect of the deficient driving force of the entire vehicle. When the entire vehicle is in the cruising condition, it can select the single power input and the smaller speed ratio transmission, to satisfy the requirement by the entire vehicle on high-speed travelling, save energy, and increase the endurance mileage of the vehicle.

The first power source of the fourth embodiment of the present disclosure is the combination of the engine 60 and the ISG motor 61, and certainly may also be configured as an electric motor.

The description above is merely particular embodiments of the present disclosure. By the foregoing teachings of the present disclosure, a person skilled in the art may make other improvements or modifications based on the foregoing embodiments. A person skilled in the art should understand that, the particular description above is merely for better interpreting the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents

What is claimed is:

1. A transverse vehicle drive assembly, connected to a vehicle axle half shaft, wherein the vehicle drive assembly comprises a first power source and an automatic transmission, the automatic transmission is provided with a first input shaft, the first power source is connected to the first input shaft, and a differential is provided at a connection between the automatic transmission and the vehicle axle half shaft;

in the automatic transmission, a first intermediate shaft is provided parallel to the first input shaft, a second intermediate shaft is provided coaxial with the first input shaft, a third intermediate shaft is provided coaxial with the first intermediate shaft, a first clutch is provided between the first intermediate shaft and the third intermediate shaft, and a second clutch is provided between the first input shaft and the second intermediate shaft; and the first input shaft is provided with a first gear, the first intermediate shaft is provided with a second gear, and the first gear and the second gear are in engaged transmission; the second intermediate shaft is provided with a third gear, the third intermediate shaft is provided with a fourth gear, and the third gear and the fourth gear are in engaged transmission; and the differential is provided with a fifth gear, and the fourth gear is simultaneously in engaged transmission with the fifth gear.

2. The transverse vehicle drive assembly according to claim 1, wherein when the first clutch is engaged, the first power source transmits power to the vehicle axle half shaft via sequentially the first input shaft, the first gear, the second gear, the first intermediate shaft, the first clutch, the third intermediate shaft, the fourth gear, the fifth gear and the differential.

3. The transverse vehicle drive assembly according to claim 2, wherein an engaged transmission ratio of the first gear to the second gear is i1, an engaged transmission ratio of the fourth gear to the fifth gear is i2, and when the first clutch is engaged, an engaged transmission ratio in the automatic transmission is i1×i2.

4. The transverse vehicle drive assembly according to claim 1, wherein when the second clutch is engaged, the first power source transmits power to the vehicle axle half shaft via sequentially the first input shaft, the second clutch, the second intermediate shaft, the third gear, the fourth gear, the fifth gear and the differential.

5. The transverse vehicle drive assembly according to claim 4, wherein an engaged transmission ratio of the third gear, the fourth gear and the fifth gear is i3, and when the second clutch is engaged, an engaged transmission ratio in the automatic transmission is i3.

6. The transverse vehicle drive assembly according to claim 1, wherein the vehicle drive assembly further comprises a second power source;

in the automatic transmission, a second input shaft is provided parallel to the second intermediate shaft, and the second power source is connected to the second input shaft;

the second input shaft is provided with a sixth gear, and the sixth gear is engaged with the third gear on the second intermediate shaft;

the second power source is an electric motor, and the second power source transmits power to the vehicle axle half shaft via sequentially the second input shaft, the sixth gear, the third gear, the fourth gear, the fifth gear and the differential; and an engaged transmission ratio of the sixth gear, the third gear, the fourth gear and the fifth gear is i4, and when both of the first clutch and the second clutch are disengaged, an engaged transmission ratio in the automatic transmission is i4.

7. The transverse vehicle drive assembly according to claim 1, wherein the first power source is an electric motor or a combination of an engine and an Integrated Starter and Generator motor.

8. The transverse vehicle drive assembly according to claim 1, wherein the first power source is a combination of an engine and an Integrated Starter and Generator motor, and a torsion damper is provided between the engine and the Integrated Starter and Generator motor.

9. The transverse vehicle drive assembly according to claim 1, wherein the vehicle axle half shaft is a front axle half shaft or a rear axle half shaft.

10. The transverse vehicle drive assembly according to claim 1, wherein the first clutch and the second clutch are contrate tooth clutches; and the contrate tooth clutches are of an electromagnetically drive type, or a hydraulically drive type, or a pneumatically drive type, or an electrically drive type.

* * * * *